No. 614,795. Patented Nov. 22, 1898.
J. F. DEACON.
SCALE BAR FOR TYPE WRITERS.
(Application filed Oct. 29, 1897.)
(No Model.)
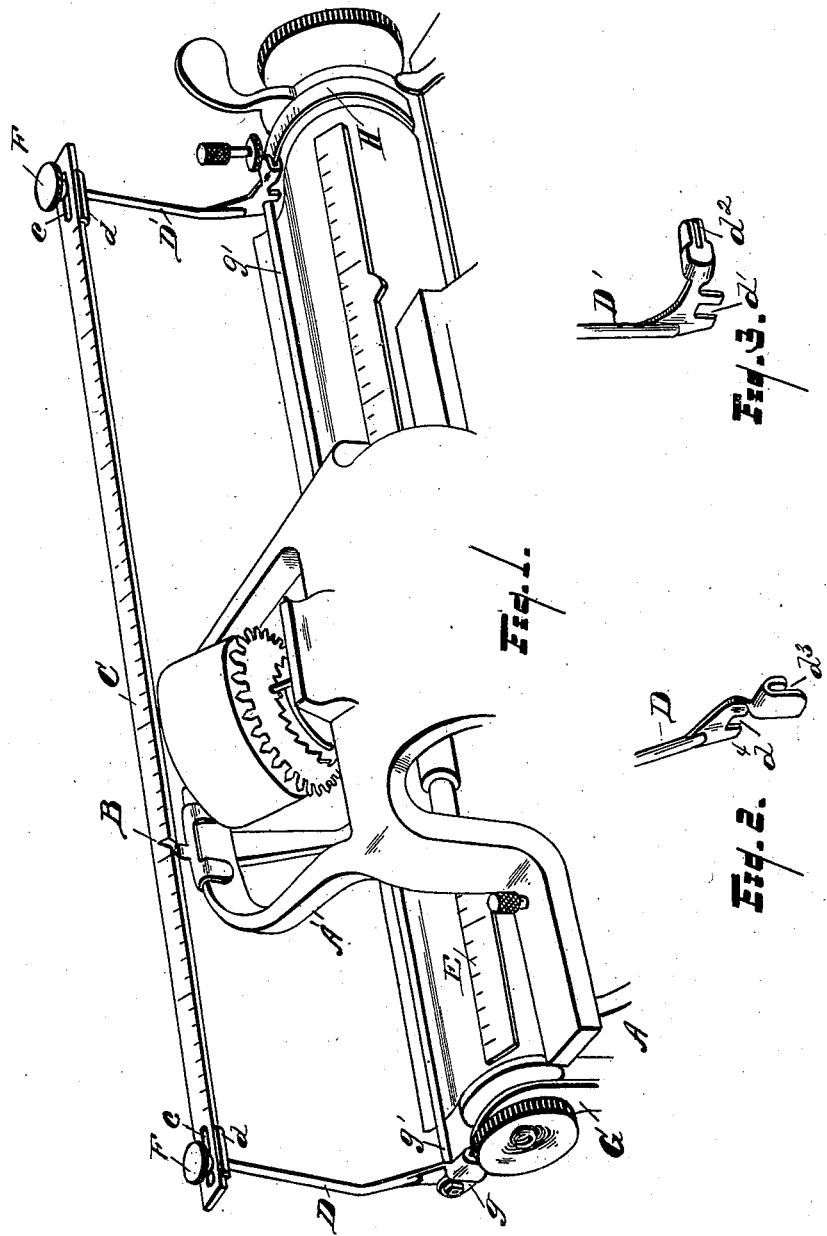
WITNESSES
INVENTOR

UNITED STATES PATENT OFFICE.

JOHN FRANCIS DEACON, OF DETROIT, MICHIGAN.

SCALE-BAR FOR TYPE-WRITERS.

SPECIFICATION forming part of Letters Patent No. 614,795, dated November 22, 1898.

Application filed October 29, 1897. Serial No. 656,739. (No model.)

*To all whom it may concern:*

Be it known that I, JOHN FRANCIS DEACON, a citizen of the United States, residing at Detroit, county of Wayne, State of Michigan, have invented a certain new and useful Improvement in Scale-Bars for Type-Writers; and I declare the following to be a full, clear, and exact description of the invention, such as will enable others skilled in the art to which it pertains to make and use the same, reference being had to the accompanying drawings, which form a part of this specification.

My invention relates to improvements in scale-bars for type-writers; and it consists in an elevated bar, with novel means for attaching it to the carriage in that class of machines in which the type or type-wheel works down on top of the rod.

It is shown in the accompanying drawings, in which—

Figure 1 is a view showing the carriage and roll, the type-wheel, and scale-bar. Fig. 2 shows the means for attaching the bar to the carriage at one end. Fig. 3 shows the means for attaching it to the opposite end.

In the drawings, A represents the frame of the machine; A', that portion of the frame overhanging the roll in which the type-wheel is mounted.

B is an index-finger mounted on the frame A', the index being in the center of the machine and in the same perpendicular plane as the axes of the type-wheel or the point of contact between the type and the paper.

C is a scale-bar extending across the machine above the frame A, adjacent to the index B. This scale is supported at the ends on standards D D'. The standards at the upper ends are provided with a threaded portion, below which is attached the flat bearing $d$, on which the scale rests.

$c$ $c$ are slots in the ends of the scales through which the threaded part of the standard passes. By means of this slotted connection between the scale and the standards the same scale can be used on a short or a long carriage and adjusted to make the upper scale C register with the platen-scale shown at E.

F F are thumb-nuts run on the thread ends of the standards to hold the scale in position.

The standards are attached to the carriage at the lower ends in the form of carriage shown in the drawings, as follows: The roll is mounted at each end in thin sheet-metal standards G G, and these standards have rear extensions $g$ $g$, that are connected by the rod $g'$. At the right hand of the machine the end of the roll is surrounded by a band H. This band extends to the rear and is attached to the rod $g'$. The standard D' at its lower end is provided with a horizontal groove $d^2$, that engages with the band H, and the vertical groove $d'$, that engages with the rod $g'$. This construction is such that this end of the scale-support is engaged with the carriage by engaging the groove $d'$ with the rod $g'$ and then moving the standard endwise until the groove $d^2$ engages with the band H.

The standard D is provided at its lower end with the vertical groove $d^4$, that engages with the rod $g'$, and the groove $d^3$, that engages with the standard G. The standards D and D' are so spaced apart that the groove $d^3$ will engage with the standard G when the standard D' at the opposite end is engaged with the band H.

The scale being supported on the carriage travels with it, while the index B marks the relative position of the carriage.

By the use of my invention a scale is provided that stands above the machine, and the means provided for engaging it with the carriage adapts it to different machines.

The index B is adjustably mounted on the frame A', and any slight adjustment necessary to make the upper and lower scales register can be made here.

What I claim is—

1. The combination of the scale, the carriage and the standards D and D', one of said standards provided with means for engaging with the carriage by a horizontal movement, and the other by a vertical movement whereby the same are locked when in position, substantially as described.

2. The combination of carriage and connecting-rods $g'$ with the scale, and the standards D and D' adapted to be engaged with said rod, substantially as described.

3. The combination of the carriage, the standards G, G, the band H, the rod $g'$; the standard D' adapted to engage with the rod $g'$ and band H at one end of the frame, the standard D adapted to engage with the rod $g'$ and standard G at the opposite end of the frame and the scale, substantially as described.

4. The combination of the carriage, and roll, the scale C, the standards adapted to support the scale over the roll, the overhanging frame A', the type-wheel having a vertical movement through the center of said overhanging frame, and the index B, mounted on the frame, in a vertical plane through the point of contact of the letter on the roll substantially as described.

In testimony whereof I sign this specification in the presence of two witnesses.

J. FRANCIS DEACON.

Witnesses:
S. E. THOMAS,
C. H. FISK.